United States Patent [19]

Brittain et al.

[11] Patent Number: 5,405,926
[45] Date of Patent: Apr. 11, 1995

[54] POLYMER COMPOSITIONS AND PRODUCTS MADE THEREFROM HAVING NONLINEAR OPTICAL PROPERTIES; METHODS FOR THEIR SYNTHESIS, AND FOR THE PRODUCTION OF THE PRODUCTS

[75] Inventors: William J. Brittain, Uniontown; Joseph J. Kulig, Akron; Collin G. Moore, Cuyahoga Falls, all of Ohio

[73] Assignee: The University of Akron, Akron, Ohio

[21] Appl. No.: 135,782

[22] Filed: Oct. 12, 1993

[51] Int. Cl.6 .................... C08G 64/12; C08G 64/38
[52] U.S. Cl. ..................... 526/260; 526/257; 526/259; 528/196; 528/201; 528/205
[58] Field of Search ............. 526/257, 259, 260; 528/196, 201, 205

[56] References Cited

U.S. PATENT DOCUMENTS

| | | |
|---|---|---|
| 4,822,865 | 4/1989 | DeMartino et al. |
| 4,838,634 | 6/1989 | Bennion et al. |
| 4,859,876 | 8/1989 | Dirk et al. |
| 5,064,264 | 11/1991 | Ducharme et al. |
| 5,106,936 | 4/1992 | Gulotty et al. |
| 5,163,060 | 11/1992 | Mitra et al. |
| 5,194,655 | 3/1993 | Yamada et al. |
| 5,208,299 | 5/1993 | Bales et al. |
| 5,212,015 | 5/1993 | Mitra et al. |

*Primary Examiner*—Mark Nagumo
*Attorney, Agent, or Firm*—Hudak & Shunk Co.

[57] ABSTRACT

This invention provides novel polyethers and polycarbonates which exhibit nonlinear optical response, and which have utility as a transparent optical component in optical light switch and high modulator devices.

These polyethers and polycarbonates are the polymerization product of one or more monomers having the formula

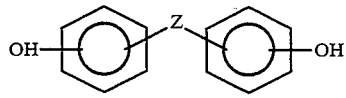

in which Z is a conjugated heterocyclic substituent having a $NO_2$ or a CN group. Further, the invention relates to a method of making the polycarbonate by a ring opening polymerization in the presence of an electric field. In a separate embodiment, the invention relates to non-linear optical devices made with these polymers.

13 Claims, No Drawings

POLYMER COMPOSITIONS AND PRODUCTS MADE THEREFROM HAVING NONLINEAR OPTICAL PROPERTIES; METHODS FOR THEIR SYNTHESIS, AND FOR THE PRODUCTION OF THE PRODUCTS

FIELD OF INVENTION

This application relates to four separate inventions:
1. Polymeric compositions which are polycarbonate or polyether made from monomers having the general formula I

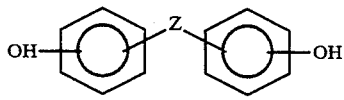

wherein Z is a conjugated heterocyclic having a substituent which is an electron withdrawing group and preferably is selected from the group consisting of $NO_2$ and CN, and more specifically wherein Z is

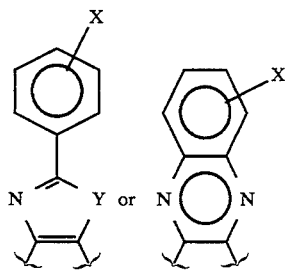

wherein Y is oxygen or sulfur and X is an electron withdrawing group such as nitro or cyano; and;
2. Methods for the synthesis of these polycarbonates which comprise a ring opening polymerization in the presence of a specific catalyst;
3. Methods for making products from these polymers which comprise poling the product formed during polymerization (i.e., polymerizing the cyclic oligomer or prepolymer in the presence of an electric field in order to cause noncentrosymmetric orientation of the polar fragments), and;
4. Products which incorporate the NLO polymers.

SUMMARY OF THE INVENTION

1. Novel Compositions

The novel compositions are polycarbonate and/or polyether polymers which are the polymerization product of a monomer (also termed the "dye" herein) having the general formula I

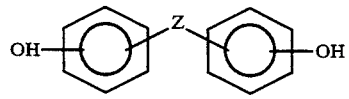

wherein Z is a conjugated heterocyclic having a substituent which is an electron withdrawing group and preferably is selected from the group consisting of $NO_2$ and CN, and more specifically wherein Z is

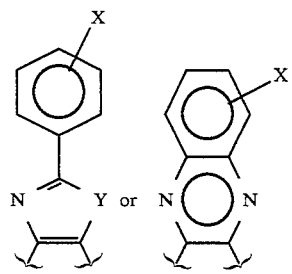

wherein Y is oxygen or sulfur and X is an electron withdrawing group such as nitro or cyano. By "polymerization" it is meant to include homopolymerization and copolymerization.

The polycarbonates have a repeat unit having general formula II,

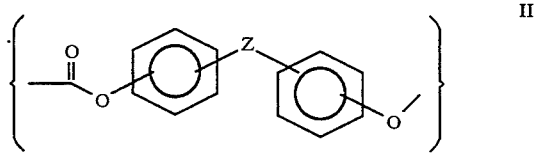

wherein Z is defined as above; The polymer is a clear polymer. This polymer has desirable properties with regard to the potential applications because it can be reaction processed into a product, or a thin film on a substrate such as glass, and it is otherwise compatible with semiconductor technology.

The invention also relates to a polyether having a repeat unit having the general formula III

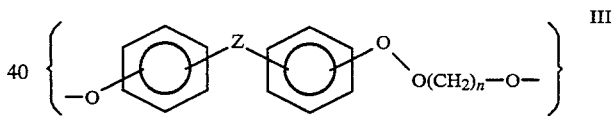

wherein $n=1-15$; preferably from 1-10; and most preferably from 1-4, wherein Z is defined as above. The invention includes copolymers having this and one or more other repeat units.

2. A Method of Synthesis for the Polycarbonate Polymer.

The invention also relates to a method of synthesis of the polycarbonate polymer which relates to the ring opening of a macrocyclic prepolymer. This prepolymer can include a macrocycle copolymer prepolymer. The synthesis is set forth below in the general scheme, Scheme 1 below in which the prepolymer is made from the monomer of having the general formula of I by macrocyclization. When the prepolymer is heated to from about 150° to about 350° C., preferably from about 150° to about 250° C., it becomes very thin, i.e., has a viscosity of less than 10,000 poise and the ring opens to initiate the polymerization in the presence of a catalyst.

3. The invention further relates to a product which incorporates the polymer having the NLO properties and which comprises a product of the polymerization of a monomer having the general formula 1. The polymer may be laid upon a substrate, such as glass with a coating of indium tin oxide or substrates otherwise suitable for semi-conductor applications or may be a self standing film. Preferably, the product is made by melt polymerization in the presence of an electrical field.

4. The invention also relates to a process for the manufacture of a product having NLO properties. In accordance with the process, a polymer is made from a monomer having the general formula 1 and polymerization occurs on a substrate in the presence of an electrical field of an appropriate strength.

BACKGROUND AND OBJECTS OF THE INVENTION

Information may be more rapidly processed and transmitted using optical as opposed to electrical signals. Optical signals can be used to enhance the performance of electronics processors. For example, electronic wires interconnecting integrated circuits (ICs) can be replaced with optical interconnects and the information processed with IC driven electro-optic modulators. Optical signals in fiber optic communications can be encoded on the optical carrier using electro-optic (EO) modulators. In both of the processes above, nonlinear optical materials with second-order nonlinear optical activity are necessary to affect the modulation of light signal.

Nonlinear optical materials can also be used for frequency conversion of laser light. Such a conversion is desirable in many applications. For example, optical memory media presently read using 830 nm light from diode lasers. The 830 nm light wavelength limits the spot sizes which can be read and hence the density of data stored on the optical memory media. Similarly, in fiber optic communications, light wavelengths of 1.3 $\mu$m or 1.5 $\mu$m are desirable due to the low transmission losses of glass fiber at those wavelengths. However, those wavelengths are too long for detection by Si based detectors. It is desirable to frequency double the 1.3 $\mu$m or 1.5 $\mu$m wavelengths to 650 nm or 750 nm wavelengths where Si based detectors could be used.

Nonlinear optical materials which have been used in electro-optic devices have in general been inorganic single crystals such as lithium niobate (LiNbO$_3$) or potassium dihydrogen phosphate (KDP). More recently, nonlinear optical materials based on organic molecules, and in particular polar aromatic organic molecules have been developed.

The nonlinear optical properties of organic and polymeric materials has been the subject of numerous symposia. The International Society for Optical Engineering (SPIE) has sponsored a number of NLO related symposia, e.g., the symposium "Nonlinear Optical Properties of Organic Materials II" on Aug. 10–11, 1989 (SPIE Processing Series, Vol. 1147, 1990). Similarly, the Materials Research Society has sponsored a symposium titled, "Nonlinear Optical Properties of Polymers" on Dec. 1–3, 1987 (Materials Research Society Symposium Proceedings, Vol. 109, 1988).

The organic based materials have a number of potential advantages over the inorganic and semiconductor based materials. First, the organic materials have higher NLO activity on a molecular basis. Organic crystals of 2-methyl-4-nitroaniline have been shown to have a higher nonlinear optical activity than that of LiNbO$_3$. Second, the nonlinear optical activity of the organic materials is related to the polarization of the electronic states of the organic molecules, offering the potential of very fast switching times in EO devices. The time response of the system to a light field is on the order of 10 to 100 femtoseconds. In contrast, a large fraction of the polarizability in the inorganic crystals is due to nuclear motions of the ions in the crystal lattice, slowing the time-response of the materials. In addition, the low dielectric constant of the organic materials (e.g. 2–5 Debye at 1 MHz) compared to the inorganic materials (e.g. 30 Debye at 1 MHz) enables higher EO modulator frequencies to be achieved for a given power consumption. Third, the organic materials can be easily fabricated into integrated device structures when used in polymer form.

It is known that organic and polymeric materials with highly polarizable $\pi$-electron systems can exhibit nonlinear optical (NLO) response. In many cases this response is much larger than that of inorganic substrates.

Of particular importance for conjugated organic systems is the fact that the origin of the nonlinear effects is the polarization of the $\pi$-electron cloud as opposed to displacement or rearrangement of nuclear coordinates found in inorganic materials.

Accordingly, it is an object of this invention to provide novel polymers having asymmetric charge distribution.

It is another object of this invention to provide polycarbonate and polyether polymers which exhibit nonlinear optical response.

It is a further object of this invention to provide a new process for the synthesis of a polycarbonate polymer having highly polarizable $\pi$-electron systems. Another object is to provide a method of making a material from such a polymer which has a non-centric alignment and which has a relatively high orientation stability. Such a material is suitable for use as a polymeric nonlinear optical component of an optical light switch and light modulator device. Accordingly, it is an object of the invention to provide laminates incorporating the NLO polymers and suitable substrates.

Other objects and advantages of the present invention shall become apparent from the accompanying description and examples.

DETAILED DESCRIPTION OF THE INVENTION

One or more objects of the present invention are accomplished by the provision of polyether or polycarbonate polymer which is characterized by recurring monomeric units derived from a monomer generally having the formula I:

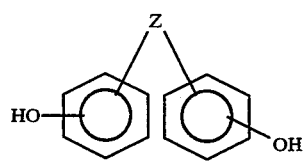

wherein Z is a conjugated heterocyclic having a substituent which is an electron withdrawing group and preferably is selected from the group consisting of NO$_2$ and CN, and more specifically wherein Z is

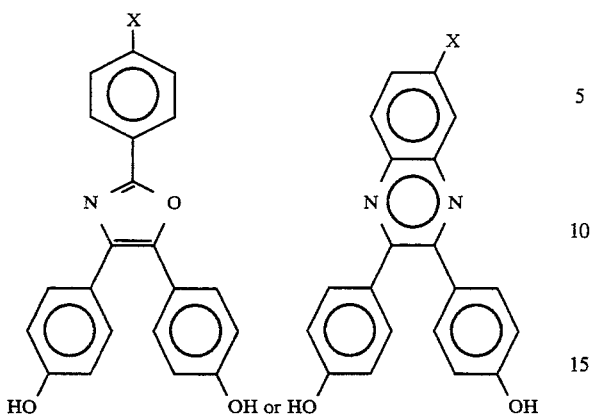

and wherein X is an electron withdrawing group selected from the group consisting of $-NO_2$, $-SO_2R$, $-SO_2CH_2F$, $-SO_2CHF_2$, $-SO_2CF_3$, $-S(-N-SO_2CF_3)CF_3$, $-CF_3$, $-CO_2R$, $-COCF_3-CN$, organovinyl, dicyanovinyl, and tricyanovinyl and R is hydrogen or a $C_1$ to $C_{20}$ hydrocarbyl radical, and preferably is $NO_2$ or CN, and most preferably $NO_2$.

It is preferable the hydroxyl group is in the para position relative to the Z substituent for each side of the molecule.

Specific monomers or "dyes" which are useful for the formula include oxazoles such as

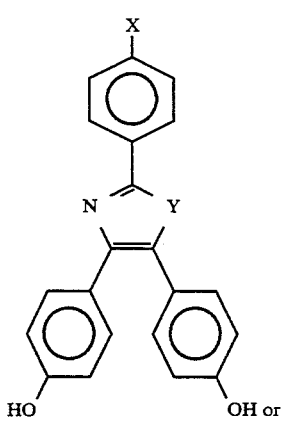

wherein X is $NO_2$ or CN and preferably $NO_2$ and Y is S or O, and preferably O or phenylquinoxalines such as

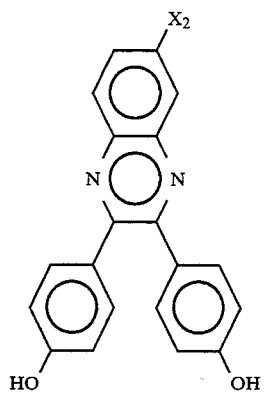

wherein X is $NO_2$ or CN and preferably $NO_2$.

The monomer is polymerized to form a homopolymer of polyether or polycarbonate polymer as is shown in Scheme 1:

Scheme 1

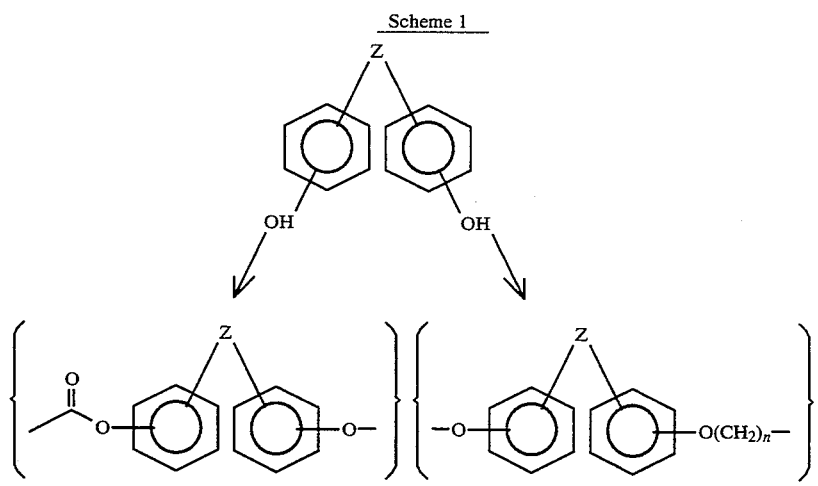

wherein Z is a conjugated heterocyclic having a substituent which is an electron withdrawing group and preferably is selected from the group consisting of $NO_2$ and CN, and more preferably wherein Z is

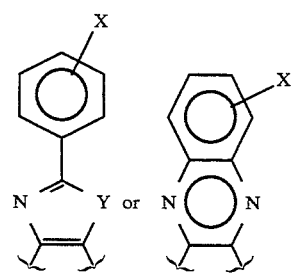

wherein Y is oxygen or sulfur and x is nitro or cyano.

In another embodiment, this invention provides a process for the synthesis of polycarbonate in which a low viscosity prepolymer is prepared through the macrocyclization of bisphenol monomers. It is possible to selectively form macrocyclic polycarbonates in yields up to 90% by carefully controlling the structure and concentration of the amine catalysts used. One particularly advantageous class of amine catalysts is trialkylamines, with triethylamine being most preferred. An acceptable concentration of catalyst is from about 0.05 to about 0.2, and preferably from about 0.9 to about 0.11 moles per liter based on total polymerization volume. In general, the first step of the conversion of the monomer to the polymeric material is the conversion of the bisphenol to bischloroformate:

Scheme II

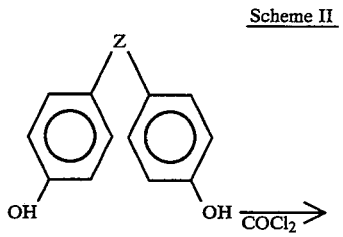

wherein Z is a conjugated heterocyclic having a substituent which is an electron withdrawing group and preferably is selected from the group consisting of $NO_2$ and CN, and more specifically wherein Z is

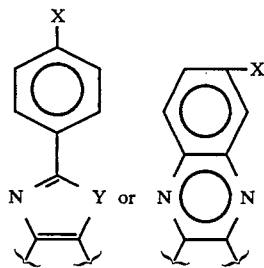

wherein Y is oxygen or sulfur and X is an electron withdrawing group selected from the group consisting of $-NO_2$, $-SO_2R$, $-SO_2CH_2F$, $-SO_2CHF_2$, $-SO_2CF_3$, $-CF_3$, $-CO_2R$, $-COCF_3$—CN, organovinyl, dicyanovinyl, and tricyanovinyl and R is hydrogen or a $C_1$ to $C_{20}$ hydrocarbyl radical, and preferably is $NO_2$ or CN, and most preferably is $NO_2$.

In accordance with the present invention, the dye monomers may also be copolymerized with one or more copolymerizable monomers. In particular, it is an advantage for the polycarbonate to be copolymerized with a copolymerizable monomer wherein the dye is present in an amount of from about 5 to about 100 percent of the resulting copolymer, preferably from about 10 to about 90 percent, and most preferably from about 30 to about 90 percent. Suitable comonomers are aromatic bisphenol comonomers with bisphenol A being a preferred comonomer. In particular, these comonomers may be used to adjust the glass transition temperature of the macrocycle (i.e., prepolymer) which is opened to form the resulting product. The copolymers are typically random co-polymers having a repeat number for the dye portion of from 10 to 70, and for the bisphenol A portion of from 30 to 90, i.e., a ratio of from about 1:9 to 7:3.

The preferred polymeric (i.e., homopolymers and copolymers) products have a number average molecular weight of from about 6,000 to about 200,000, preferably from about 50,000 to about 200,000. The polymer is amorphous, generally has a yellow color and is transparent.

In another embodiment, the invention relates to a method of making a orientation stable NLO polymer in which the polymerization occurs in the presence of an electrical field. In particular, the process is useful for the ring opening melt polymerization of a macrocyclic prepolymer to form a polycarbonate homopolymer or copolymer as is shown in the polymerization Scheme below.

Scheme III

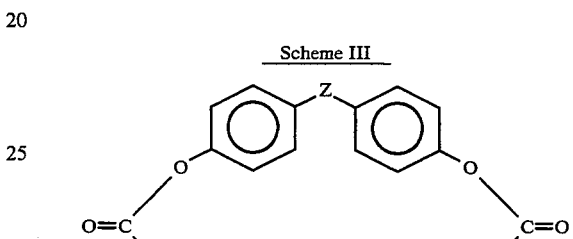

wherein Z is a conjugated heterocyclic having a substituent which is an electron withdrawing group and preferably is selected from the group consisting of $NO_2$ and CN, and more specifically wherein Z is

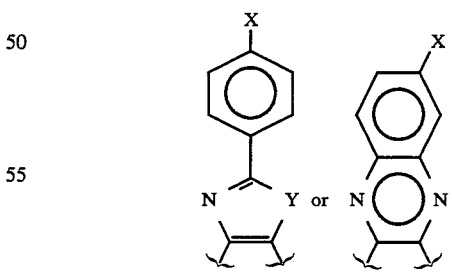

wherein Y is oxygen or sulfur and x is nitro or cyano.

The bischloroformate can be cyclized by the addition of triethylamine and $CH_2Cl_2$ and NaOH in the presence of heat. The ring can subsequently be opened as shown below through the addition of heat (i.e., initiation temperatures of from about 150° to about 400° C., and preferably from about 150 to about 250° C.) in the presence of a catalyst such as titanium bis-(isopropoxy)acetoacetonate, lithium phenoxide, and aluminum bis(ethylacetoacetate) bis(isopropoxide).

Optimal polymerization conditions for device fabrication will be determined by the utility of polycarbonate macrocycles in composite construction. Several key control variables include viscosity and initiation temperature. A key consideration in device fabrication is the viscosity of the macrocyclic prepolymer during poling and polymerization. The viscosity can be controlled by polymerization temperature and the composition of the macrocycles (i.e., the including of variable amounts of a co-monomer which will suppress the melting point of the cycles). Suitable viscosity ranges are from about 10 to about 10,000 poise.

In accordance with another embodiment of the invention, a proposed synthesis of polyethers using bisphenol monomer 1 is shown in Scheme IV. This polymer product can be subjected to an electrical field in a post polymerization step at the glass transition temperature.

Scheme IV

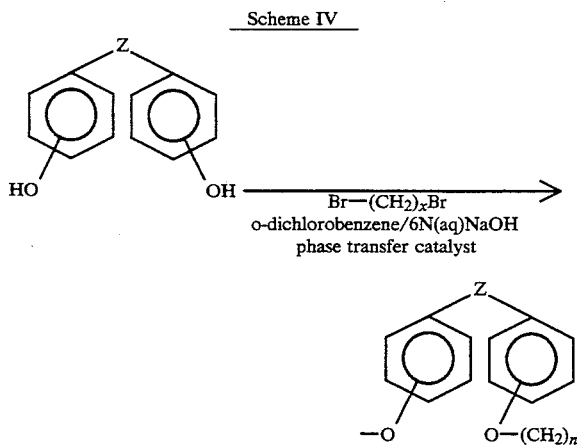

wherein Z is a conjugated heterocyclic having a substituent selected from the group consisting of $NO_2$ and CN, and more specifically wherein Z is

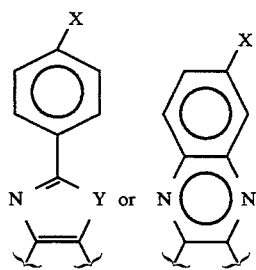

wherein Y is oxygen or sulfur and x is nitro or cyano, and wherein n is 1-15; preferably 1-10 and most preferably 1-4.

The conditions of synthesis are based on recent synthetic efforts directed toward liquid-crystalline polyethers. Device fabrication of the polyether's NLO materials differs from the carbonates in that film fabrication and electric field poling will follow a more conventional approach, i.e., solution casting technique of the polyether following by poling above the Tg.

The primary motivation for preparing the polyethers of the present invention is to maximize the donor acceptor properties of NLO chromophore in the polymer. Qualitative predictions of the molecular hyperpolarizability ($\beta$, the second order NLO coefficient) can be based on the electron donating and accepting strength of substitution. The fundamental concepts of nonlinear optics and their relationship to chemical structures are related to the polarization induced in an atom or molecule by an external field. More detailed theoretical aspects are described in "Quantum Electronics" by A. Yariv, chapters 16-17 (Wiley and Sons, New York, 1975).

Electro optical measurements of the polymer can be performed to establish the value of second order and nonlinear susceptibility of the optically clear substrates.

External Field-Induced Side Chain Orientation

The term "external field" as employed herein refers to an electric, magnetic or mechanical stress field which is applied to a medium of mobile organic molecules, to induce dipolar alignment of the molecules parallel to the field.

The nonlinear optically responsive side chains of a present invention polymer may be aligned by the application of an external electrical field to a mobile matrix of the polyether or polycarbonate molecules. Application of a DC electric field produces orientation by torque due to the interaction of the applied electric field and the net molecular dipole moment of the polymer side chains. The molecular dipole moment is due to both the permanent dipole moment (i.e., the separation of fixed positive and negative charge) and the induced dipole moment (i.e., the separation of positive and negative charge by the applied field).

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed.

In another embodiment, this invention provides a transparent nonlinear optical medium comprising a polycarbonate or polyether polymer having a structure as represented in the above formula.

In another embodiment, this invention provides a transparent nonlinear optical medium comprising a polycarbonate or polyether having a structure as represented in the above formula, and being further characterized by an external field-induced orientation of asymmetric acceptor/donor charge distribution.

The present invention polymer has a glass-like appearance which is optically transparent in both solid and melt phases. Further, the polymer is tractable, and the relatively low viscosity of the melt phase facilitates induced orientation of the polymer side chains by means of an external field.

The term "transparent" as employed herein refers to an optical medium which is transparent or light transmitting with respect to incident fundamental light frequencies and created light frequencies. In a nonlinear optical device, a present invention polymeric nonlinear optical component is transparent to both the incident and exit light frequencies, and the polymeric nonlinear optical component exhibits less than about 15 percent scattering of transmitted incident light.

A present invention optical light switch or light modulator device typically will have a polymeric nonlinear optical component which is a transparent solid medium of a polycarbonate or polyether having a stable orientation of an external field-induced alignment of pendant side chains.

Illustrative of a present invention optical device containing a polymeric nonlinear optical component as defined above is a laser frequency converter, an optical Pockels effect device, an optical Kerr effect device, a degenerate four wave mixing device, an optical interferometric waveguide gate, a wide-band electro optical guided wave analog-to-digital converter, an all-optical multiplexer, an all-optical demultiplexer, an optical bi-stable device, or an optical parametric device.

Optical harmonic generating devices are described in Science, 216 (1987); and in U.S. Pat. Nos. 3,234,475; 3,395,329; 3,694,055; 3,858,124; and 4,536,450.

Optical Kerr effect devices are described in U.S. Pat. Nos. 4,428,873 and 4,515,429; and references cited therein.

Degenerate four wave mixing optical devices are discussed by Y. R. Shen in Chapter 15, "The Principles of Nonlinear Optics"; John Wiley & Sons, New York (1984). A nonresonant degenerate four wave mixing mirror device is described by J. Feinberg et al. in Optics Letters, 5 (12), 519 (1980).

An optical interferometric waveguide gate device is described by A. Lattes et al. in IEEE J. Quantum Electron, QE-19 (11), 1718 (1983).

A wide-band electro optical guided-wave analog-to-digital converter device is described by R. A. Becker et al. in Proceedings of the IEEE, 72 (7), 802 (1984).

Optical Multiplexer-demultiplexer devices are described in U.S. Pat. Nos. 3,532,890; 3,755,676; 4,427,895; 4,455,643; and 4,468,776.

Optical bi-stable devices are described in U.S. Pat. Nos. 4,515,429 and 4,583,818; and by P. W. Smith et al. in Applied Physics Letters, 30 (6), 280 (1977), and in IEEE Spectrum, June 1981.

Optical parametric devices are described in U.S. Pat. Nos. 3,3712,220; 3,530,301; and 3,537,020.

EXAMPLES

EXAMPLE 1

Preparation of an oxazole dye, i.e., 4,5-Bis(4-hydroxyphenyl)-2-(4-nitrophenyl)-oxazole

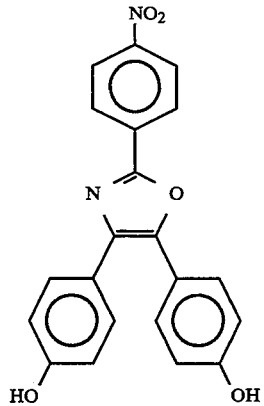

Anisaldehyde (480 g), potassium cyanide (120 g), 400 ml water and 500 ml 95% ethanol were heated at reflux for 1.5 hour. Following the addition of 200 ml water, the mixture was cooled to room temperature and the 4,4'-dimethoxybenzoin precipitated from solution. The solid was washed with 95% ethanol and dried in vacuo. The yield was 167 g (40%). The 4,4'-dimethoxybenzoin (120 g) was dissolved in 1000 ml tetrahydrofuran. To this solution were added p-nitrobenzoic acid (75.2 g), dicyclohexylcarbodimide (92 g) and 4-(N,N-dimethylamino)pyridine (6.5 g) and the solution was stirred for 24 hours at room temperature. The reaction mixture was filtered and the solvent removed in vacuo to afford p-nitrobenzoate ester. This ester (15.1 g) and ammonium acetate (15.2) were dissolved in 250 ml glacial acetic acid and the mixture was refluxed for 1 hour. After cooling, 200 ml water was added and 4,5-(4-methoxyphenyl)-2-(p-nitro-phenyl)oxazole precipitated as an orange solid. Yield 5.79 g (30%); mp=206°-209° C. $^1$H NMR (CDCl$_3$) δ8.3 (m, 4H), 7.6 (m,4H), 6.9 (m, 4H), 3.7 (s, 6H, OCH$_3$).

Concentrated hydrochloric (100 ml) was added to 1000 ml pyridine and the water removed by distillation. The solid was then heated to 200° C. for 0.5 hours. After cooling 140° C., the 4,5-(4-methoxyphenyl)-2-(p-nitrophenyl)oxazole (142 g) was added and the mixture was stirred for 3 hours at 210° C. After cooling to room temperature, 4 L water were added and the solids collected by filtration. Recrystallization from hot ethanol afforded a light tan solid. Yield 56 g (42%), mp 264°-266° C. $^1$H NMR (CDCl$_3$) δ8.85, 8.64 (s, 2H OH), 8.37 (m, 4H), 7.5 (m, 4H), 6.90 (m, 4H).

EXAMPLE 2

Preparation of a quinoxaline dye, i.e., 6-Nitro-2,3-bis(4-hydroxyphenyl)phenylquinoxaline

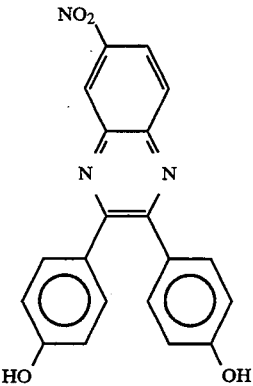

4,4'-Dimethoxybenzoin was prepared as described in Example 1. 4,4'-Dimethoxybenzil (50.3 g), ammonium nitrate (20.3 g), cupric acetate (0.69 g) and 150 ml 80% acetic acid were heated to 80° C. with vigorous stirring until a clear, green solution was obtained. Following 1 hour at reflux, the mixture was poured into 1 liter of water and the precipitate was collected. Recrystallization from hot methanol afforded 4,4'-dimethoxybenzil. Yield 44.2 g (88%). $^1$H NMR (CDCl$_3$) δ7.97 (m, 4H, aromatic), 6.97 (m, 4H, aromatic, 3.86 (s, 6H OMe).

4,4'-Dimethoxybenzil (10 g), 90 ml glacial acetic acid and 160 ml 48% HBr were heated at reflux for 4 hours. The reaction mixture was poured into ice and the product collected by filtration. Dissolution of the solid into 10% aqueous sodium hydroxide, extraction with diethyl ether and acidification of the aqueous layer gave 4,4'-dihydroxybenzil which was recrystallized from 75% ethanol. Yield 7.5 g (84%). $^1$H NMR (acetone-d$_6$) δ9.53 (s,2H, OH), 7.81, 6.98 (m, 8H, aromatic).

4,4'-Dihydroxybenzil (4.94 g), 4-nitro-1,2-phenylenediamine (3.12 g), 4 drops of trifluoroacetic acid, and 100 ml methanol were heated to reflux for 5 hours. Addition of water resulted in precipitation of 6-nitro-2,3-bis(4-hydroxyphenyl)phenylquinoxaline. The filtrate was washed with hot ethyl acetate and hexane. Yield 5 g (68%); mp—290°-292° C. $^1$H NMR (CDCl$_3$) δ8.82, 8.48, 8.24 (m, 3H phenylquinoxaline), 8.80 (s, 2H, OH), 7.5, 6.84 (m, 8H, aromatic).

EXAMPLE 3

Preparation of a chloroformate dye, i.e., 4,5-Bis[4-chloroformyloxy)phenyl]-2-(4-nitrophenyl)oxazole (NPO-BCF).

4,5-Bis(4-hydroxyphenyl)-2-(4-nitrophenyl)oxazole (7.48 g) was dissolved in 30 ml toluene and cooled to 0° C. under nitrogen. Phosgene (11 g) was condensed into the chilled flask and N,N-diethylaniline (6.2) was added. The solution cleared after warming to room temperature and the reaction mixture was washed three times with dilute HCl and the solvent removed in vacuo. Yield 7.1 g (86% yield). IR (film) 1550 cm$^{-1}$ (oxazole), 1520 cm$^{-1}$ (nitro), 1789, 1165, 1119 cm$^{-1}$ (chloroformate). $^1$H NMR (CDCl$_3$) δ8.43, 7.88, 7.50 (m, 12H).

EXAMPLE 4

Preparation of a chloroformate quinoxaline dye, i.e., 6-Nitro-2,3-bis[4-chloroformyloxy)phenyl] phenylquinoxaline (NPQ-BCF)

In this example, 6-Nitro-2,3-bis[4-(chloroformyloxy)-phenyl] phenylquinoxaline was prepared according to the procedure of Example 3. 6-Nitro-2,3-bis(4-hydroxyphenyl)phenylquinoxaline (5 g), phosgene (4 g) and N,N-diethylaniline (4 g) were used. Yield 6.24 g (92%). IR (CH$_2$Cl$_2$ solution)1782 cm$^{-1}$ (chloroformate). $^1$H NMR (CDCl$_3$) δ9.5, 8.57, 8.28 (m, 3H, phenylquinoxaline aromatic), 7.64, 7.26 (m, 8H, chloroformate aromatic CH).

EXAMPLE 5

This example describes the synthesis of a mixed macrocycle of bisphenol-A bischloroformate (BPA-BCF)/4,5-bis[4-chloroformyloxy)phenyl]-2-(4-nitrophenyl)oxazole (NPO-BCF) having a molar ratio of 4/1. A two neck flask was charged with 20 ml of CH$_2$Cl$_2$, 3 ml water, 91 mg NaOH, and 0.24 ml of triethylamine. A solution of NPO-BCF (1.81 g) and BPA-BCF (5.70 g) in 30 ml in CH$_2$Cl$_2$ was added at a rate of 2.0 ml/min. Every five minutes, 0.2 ml of 50 wt % NaOH and 0.024 ml amine were added. The reaction mixture was washed with dilute HCl and the solvent removed in vacuo to afford 5.5 g (99%) yield) of crude product. GPC analysis of the product indicated that both linear polymer (56%) and macrocycles (44%) were obtained. Selective dissolution of the macrocycles into acetone followed by precipitation in methanol afforded the crude macrocycles; which were purified further by precipitation from CH$_2$Cl$_2$ into methanol. Macrocycles yield 1.48 g (28%); mp=110°-135° C. M$_n$ (SEC)=890 g/mol (based on polystyrene standards). $^1$H NMR (CDCl$_3$) δ8.45, 7.9, 7.5 (m, 12H oxazole-aromatic), 7.2 (m, 8H, BPA-aromatic), 1.7 (s, 6H, isopropylidine). Based on NMR, the macrocycles contained 13% oxazole monomer.

EXAMPLE 6

This example describes the synthesis of a mixed macrocycle of bisphenol-A bischloroformate (BPA-BCF)/4,5-bis[4-chloroformyloxy)phenyl]-2-(4-nitrophenyl)oxazole (NPO-BCF) having a molar ratio of 1/1. The procedure followed that in Example 5 using 4.99 g NPQ-BCF and 3.545 g BPA-BCF. Macrocycles yield 2.18 g (34%); mp=133°-170° C. M$_n$ (SEC)=610 g/mol (based on polystyrene standards).

EXAMPLE 7

This example describes the synthesis of a mixed macrocycle of bisphenol-A bischloroformate (BPA-BCF)/6-nitro-2,3-bis[4-chloroformyloxy)phenyl]-phenylquinoxaline (NPQ-BCF) having a molar ratio of 4/1 according to the general procedure in Example 5. In this example, NPQ-BCF (1.09 g) and BPA-BCF (5.65 g) were reacted to afford the mixed macrocycle. Yield 2.37 g (48%), mp=184°-195° C. Based on NMR, the macrocycles contained 21% oxazole monomer. M$_n$ (SEC)=1370 g/mol (based on polystyrene standards).

EXAMPLE 8

This example describes the ring-opening polymerization of the macrocycles from Example 5. The macrocycles (0.25 g) were combined with Tyzor AA an ester of ortho-titanic acid sold by E. I. Du Pont de Nemours & Co., of Wilmington, Del. (0.032 mg in 32 μl dichloromethane). The solids were heated at 275° C. for 40 min to give a clear, yellow film. Tg =166° C. M$_w$ (SEC)=33,600 g/mol (based on polystyrene standards); polydispersity=6.3.

EXAMPLE 9

This example describes the ring-opening polymerization of the macrocycles from Example 7. The macrocycles (0.25 g) were combined with Tyzor AA (0.026 mg in 26 μl dichloromethane). The solids were heated at 275° C. for 40 min. Precipitation from methanol gave the polymer. Yield 0.23 g (92%) Tg=174° C. M$_w$ (SEC)=50,000 g/mol (based on polystyrene standards); polydispersity=4.7.

EXAMPLE 10

This example describes the preparation of the polyether (n=10) of 4,5-bis(4-hydroxyphenyl)-2-(4-nitrophenyl)-oxazole and 1,10-dibromodecane. All polyethers were synthesized using typical phase transfer conditions: a twenty fold molar excess of base (6N aqueous sodium hydroxide) to the bisphenol, a slight stoichiometric excess of alkyl halide relative to the bisphenol, 50 % wt/vol of alkyl halide to solvent, and 20 mol % tetrabutylammonium hydrogen sulfate (phase transfer catalyst).

4,5-Bis(4-hydroxyphenyl)-2-(4-nitrophenyl)oxazole (3.21 g), 6N sodium hydroxide (13 ml), 15.6 ml o-dichlorobenzene, 1,10-dibromodecane (2.34 g) and tetrabutylammonium hydrogen sulfate (1.06 g) were stirred rapidly and heated at 80° C. for 5 hours under an argon atmosphere. Separation of the organic phase and precipitation of the product in methanol gave a mixture of cyclics (approximately 30%) and linear polymer. Yield 5.5 g (99%), Tg=100° C. $^1$H NMR (CDCL$_3$) δ8.30, 7.55, 6.90 (m, 12H aromatic), 3.95 (t, 4H OCH$_2$), 1.80 (m, 4H, OCH$_2$CH$_2$), 1.41 (m, 12H, CH$_2$). M$_n$ (SEC)=12,400 g/mol (based on polystyrene standards).

EXAMPLE 11

The polyformals were synthesized using a modification of the conditions in Example 10, more specifically, this refers to a polyether of Example 10, except wherein n=1. Dichloromethane was the solvent and co-monomer. o-Dichlorobenzene can be used as a co-solvent. A equimolar amount of phase transfer catalyst was used (relative to bisphenol).

This example describes the preparation of the polyformal derived from the monomer described in Example 1. 4,5-Bis(4-hydroxyphenyl)-2-(4-nitrophenyl)-oxazole (3.74 g), 6N aqueous sodium hydroxide (17 ml), 8 ml dichloromethane and tetrabutylammonium hydrogen sulfate (3.4 g) were stirred rapidly at 80° C. for 5 hours. Following precipitation in methanol, a light yellow solid was obtained. Yield 2.7 g (70%), Tg=194° C. The product was insoluble in most solvents (except for hot DMSO) which prevented molecular weight determination.

EXAMPLE 12

This example describes the preparation of the polyformal of 6-nitro-2,3-bis(4-hydroxyphenyl)phenylquinoxaline and BPA, the dye of Example 2. The polyformal of a mixture of the phenylquinoxaline and BPA was prepared to alleviate the solubility problems encountered with the polyformal of the oxazole. 6-Nitro-2,3-bis(4-hydroxyphenyl)phenylquinoxaline (0.5 g), BPA (0.318 g), 4.63 ml 50% sodium hydroxide, 3 ml dichloromethane, 6.2 ml o-dichlorobenzene, tetrabutylammonium hydrogen sulfate (0.94 g), and 4-sec-butylphenol (4.2 mg) were combined and stirred rapidly at 80° C. for 5 hours. The 4-sec butylphenol is used as a chain terminating agent. Yield 0.816 g (99%); Tg=149° C. Approximately 20% of the product was cyclics. 1H NMR (CDCl$_3$) δ8.95, 8.43, 8.16 (m, 3H, phenylquinoxaline), 7.62, 7.32 (m, 8H, aromatic), 7.18 (m, 8H BPA aromatic), 6.2 (m, 2H OCH$_2$O), 1.63 (s, 6H, isopropylidene). The ratio of NPQ/BPA incorporated into the polyformal was 0.89 based on NMR. $M_n$ (SEC)=22,200 g/mol (based on polystyrene standards).

EXAMPLE 13

Thin film samples were prepared by spin coating. A 10 wt/wt % solution (in toluene) of polymer from example 8, was prepared. The solution was centrifuged for 45 minutes as 2,000 rpm, decanted off and filtered through a 0.45 micron syringe filter to remove particulate. Indium tin oxide coated glass substrates were rinsed with filtered methanol and dried with lens paper followed by high purity nitrogen. The 10 wt/wt % solution was flooded onto the substrate sample; the excess was spun off at 1,800 rpm. Finally, the coated samples were vacuum dried at room temperature.

While in accordance with the Patent Statutes, the best mode and preferred embodiment has been set forth, the scope of the invention is not limited thereto, but rather by the scope of the attached claims.

What is claimed is:

1. (a) A polycarbonate which is derived by ring opening polymerization from a bisphosgene derived macrocyclic intermediate that is the polymerization product a bisphosgene with of one or more monomeric units or (b) a polyether which is derived by a condensation polymerization from a dihaloalkane and one or more monomeric units, at least one of said monomeric units having the general formula:

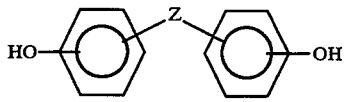

wherein Z is selected from the group consisting of

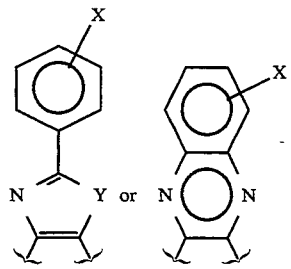

wherein X is an electron withdrawing group, and Y is oxygen or sulfur.

2. A polymer as set forth in claim 1, wherein X is nitro or cyano.

3. A polymer as set forth in claim 1 in which the hydroxyl substituents are located para to the Z substituent.

4. A polymer as set forth in claim 3 which is a polycarbonate.

5. A polymer as set forth in claim 3 which is a polyether.

6. A polymer as set forth in claim 5 having a weight average molecular weight of from about 50,000 to about 200,000.

7. A polymer as set forth in claim 1 in which X is nitro and Y is oxygen.

8. A polymer as set forth in claim 7 having a weight average molecular weight of from about 6,000 to about 200,000.

9. A (a) polycarbonate which is derived from a bisphogene derived macrocyclic intermediate that is the polymerization product of one or more monomeric units or (b) a polyether which is derived by a condensation polymerization from a dihaloalkane and one or more monomeric units said at least one monomeric unit having the formula

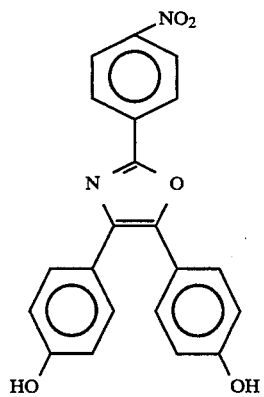

Formula I

-continued

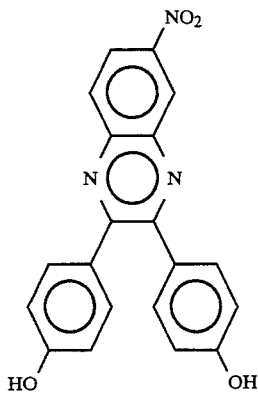

Formula II and having a number average molecular weight of from about 6,000 to about 200,000.

10. A polycarbonate as set forth in claim 9, which is a copolymer.

11. A polycarbonate as set forth in claim 10, in which the copolymer is the polymerization product of the first monomer and a monomer of bisphenol A.

12. A polyether as set forth in claim 9, which is a homopolymer.

13. A laminate comprising a substrate in a polymer which is either a polycarbonate derived from a bisphosgene derived macrocyclic intermediate that is the polymerization product of one or more monomeric units or a polyether which is derived by condensation polymerization from a dihaloalkane and one or more monomeric units, said at least one of said monomeric unit having the general formula

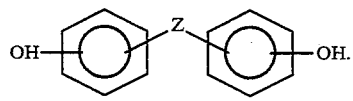

* * * * *